(12) United States Patent
Addy

(10) Patent No.: US 7,446,654 B2
(45) Date of Patent: Nov. 4, 2008

(54) MONITORED VOLTAGE INVERTER FOR SECURITY SYSTEM

(75) Inventor: Kenneth L. Addy, Massapequa, NY (US)

(73) Assignee: Honeywell International Inc., Morristown, NJ (US)

(*) Notice: Subject to any disclaimer, the term of this patent is extended or adjusted under 35 U.S.C. 154(b) by 272 days.

(21) Appl. No.: 11/373,637

(22) Filed: Mar. 9, 2006

(65) Prior Publication Data

US 2007/0210915 A1 Sep. 13, 2007

(51) Int. Cl.
*G08B 1/00* (2006.01)
(52) U.S. Cl. ..................................... 340/531
(58) Field of Classification Search ................ 340/531, 340/541, 506, 636.1; 307/66
See application file for complete search history.

(56) References Cited

U.S. PATENT DOCUMENTS

| | | | | |
|---|---|---|---|---|
| 5,705,982 | A * | 1/1998 | Faltings | 340/541 |
| 5,999,094 | A * | 12/1999 | Nilssen | 340/507 |
| 6,288,640 | B1 * | 9/2001 | Gagnon | 340/539.17 |
| 6,366,211 | B1 | 4/2002 | Parker | |
| 2003/0190906 | A1 | 10/2003 | Winick | |
| 2005/0206241 | A1 * | 9/2005 | Saxena et al. | 307/66 |
| 2007/0035627 | A1 * | 2/2007 | Cleary et al. | 348/159 |

\* cited by examiner

*Primary Examiner*—Phung Nguyen
(74) *Attorney, Agent, or Firm*—Scully, Scott, Murphy & Presser, P.C.

(57) ABSTRACT

A monitored voltage inverter for a security system is disclosed. A voltage inverter is coupled to the power supply of the control panel which can provide AC power to the network hardware devices. The voltage inverter converts the DC voltage of a back-up power supply to household or commercial AC current. In a preferred embodiment, the voltage inverter is mounted on the printed circuit board and is coupled to the network hardware devices.

21 Claims, 2 Drawing Sheets

MONITORED VOLTAGE INVERTER FOR SECURITY SYSTEM

BACKGROUND OF THE INVENTION

1. Field of the Invention

The invention relates to residential and commercial security systems, and more particularly to a voltage inverter for a security system.

2. Discussion of the Prior Art

Modern residential and commercial security systems may be connected to a central monitoring station via the internet or an intranet. The central monitoring station provides, among other things, for updates and upkeep of the security system. Additionally, the central monitoring station may have security personnel who are trained to handle facility emergencies or alarms. As such, the connection to the central monitoring station is crucial for the proper operation of the security system.

Generally, connections between the security system and the central monitoring station may be via external switches, routers and modulator/demodulator (modem). Referring generally to FIG. 1, the connection from the control panel 110 to central monitoring station 170 may be through the Internet 195 or through some proprietary network connection. In general, the external switches, routers and modulator/demodulator and other components rely on AC power sources to properly operate.

Generally, the control panel of the security systems may be powered by AC power sources backed up by a battery. The battery provides for back-up in those cases where the regular AC power source is interrupted due to outage or intentional sabotage. Generally, a battery back-up will provide approximately 24 hours of back-up power for the components of the control panel.

There may be possible problems with the security system as configured normally. If a power outage or sabotage disables the AC power source for the security control panel, the battery provides for temporary back-up so that the sensors and the control panel stay in operation. However, the external switches and routers and other network components which provide connections to the central monitoring station may become inoperable. Interruptions in the service of the external switches and routers may result in the loss of security as communications between the control panel and the central monitoring station may be lost. Additionally, even if the security system provides for back-up communications with the central monitoring station, such as a telephone line or wireless modem, any power outage may affect those network components as well.

A potential solution is to provide battery back-up for every network component device so that the network component device is operable even when the AC power supply is interrupted. However, the additional circuitry needed for individual battery back-up for each component device can make this solution costly. Additionally, the bulk added to each network component device would make placing the network component devices unwieldy. Further, the task of checking and maintaining each battery back-up would be cost prohibitive. Additionally independent battery back-up does not allow faults or trouble conditions to be detected and reported by the security system. Additionally, the invention allows low-cost commercially available network components to be used in the system.

SUMMARY OF THE INVENTION

The present invention provides a monitored voltage inverter for a security system. A voltage inverter is coupled to the power supply of the control panel which can provide AC power to the network hardware devices. The voltage inverter converts the DC voltage of a back-up power supply to household or commercial AC current. In a preferred embodiment, the voltage inverter is mounted on the printed circuit board and is coupled to the network hardware devices.

In one aspect the invention is a security system comprising: a control panel; sensors electrically coupled to said control panel; a network hardware device coupled to said control panel for transmitting and receiving data; a power supply for powering said control panel, said power supply coupled to an AC power source and a back-up power source; and a voltage inverter in series with said power supply, said voltage inverter configured for powering said network hardware device.

In another aspect, the invention is a method of providing power to a security system, said security system including a control panel; sensors electrically coupled to said control panel; a network hardware device coupled to said control panel for transmitting and receiving data; a power supply for powering said control panel, said power supply coupled to an AC power source and a back-up power source; and a voltage inverter in series with said power supply, said method comprising the steps of: at the voltage inverter, monitoring said AC power source; providing AC power to said control panel and to said network hardware device if said AC power source is operating; and if said AC power source is interrupted, converting DC power from said back-up power source to AC power and providing said AC power to said network hardware device.

BRIEF DESCRIPTION OF THE DRAWINGS

The foregoing objects and advantages of the present invention for a monitored voltage inverter for a security system may be more readily understood by one skilled in the art with reference being had to the following detailed description of several embodiments thereof, taken in conjunction with the accompanying drawings in which.

DETAILED DESCRIPTION OF THE INVENTION

Reference will now be made in detail to embodiments of the invention, examples of which are illustrated in the accompanying drawings, While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, the present invention may be practiced without those specific details. In other instances, well known methods, procedures, components and circuits have not been described in detail as not to unnecessarily obscure aspects of the present invention.

Figure 1:
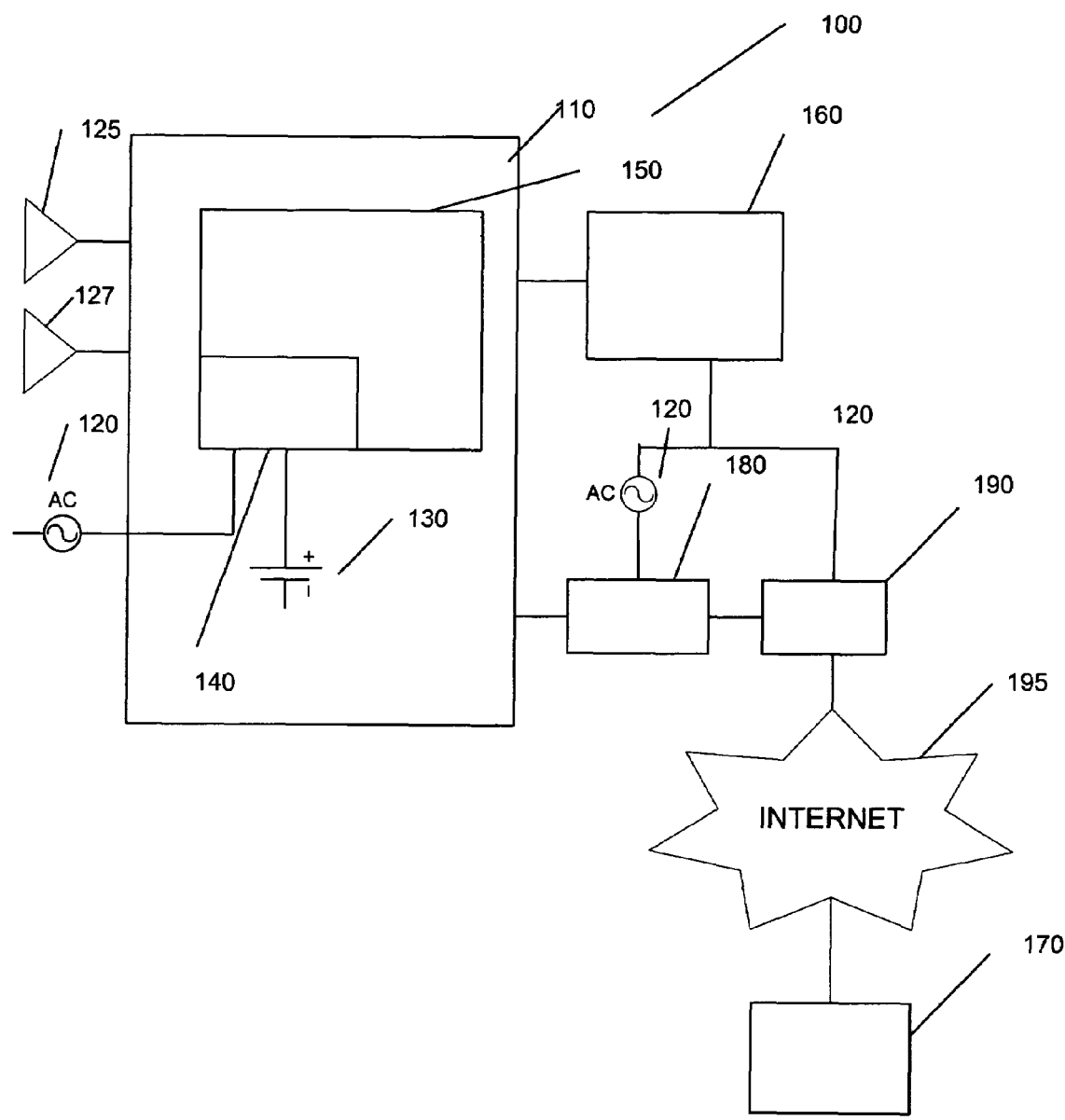
FIG. 1 is a schematic diagram of a prior art security system.

Referring to FIG. 1, there is shown a schematic diagram of a typical prior art residential or commercial security system 100. Security system 100 includes a control panel 110 which may use proprietary buses and separate wiring and cables within a building to communicate with a variety of sensors 125 and 127. The sensors 125, 127 may be, for example, radio frequency motion sensors, cameras, alarm reporting devices, or the like, which generally report intrusions or emergencies in the building to the control panel. The control panel 110 typically houses the electronics of the control panel on a printed circuit board 150. Although not described in detail here, the printed circuit board 150 may contain electronic components for prioritizing and maintaining sensor inputs to the security system and various detection and reporting components for reporting conditions to the central monitoring station. The printed circuit board includes a power supply 140 for regulating the power delivered to components on the printed circuit board and to sensors 125 and 127.

Electrical power/current is provided to networking hardware devices over electrical wiring/cables to the printed circuit board and to network switches and routers 180 and 190. Residential buildings and commercial establishments may, as a matter of convenience, provide electrical power to the networking hardware devices by using the electrical power available at the premises. For example, the same electrical power 120 is provided to Ethernet hub 180 for facilitating communication to the central monitoring station 170 via the Internet 195 or some other communication network. The same source of electrical power 120 may be provided to the network hub/switch 180 for modulating and demodulating data transmitted to or received from the central monitoring station 170.

The security system may include a back-up communication equipment 160 for providing communication to the central monitoring station 170 when the primary communication is unavailable. Such back-up communication equipment 160 may be a GSM dialer configured to communicate wirelessly to the central monitoring station. Such back-up communication equipment 160 may be a telephone modem configured for communicating with the central monitoring station 170 through plain old telephone service (POTS) lines. Although the back-up communication equipment 160 is illustrated as a separate component, it may be integrated within the printed circuit board 150 or the control panel 110. The back-up communication equipment 160 is powered by the same electrical power 120.

Generally, the control panel and sensors are powered by a power supply 140 which regulates the voltage and current to prevent overloading or spikes in the voltage. The power supply additionally monitors the AC power source 120 for interruptions, and switches to the back-up power supply 130 in those cases. The back-up power supply 130 is illustrated as a rechargeable lead acid battery providing DC power to the control panel and the sensors. It will be understood that the back-up power supply may be an uninterruptible power supply (UPS) which may be comprised of a lead-acid battery, generator, a metal fuel cell or any other isolated power source. In any case, the back-up power supply may have the capacity to provide power to the control panel and sensors for a short period of time, typically on the order of 24 hours.

The illustrated security system 100 may, however, experience problems if the AC power supply is interrupted. Since the network hardware devices are powered by the same AC power supply, any interruption in the AC power supply will render the network hardware devices 180 and 190 inoperable. Additionally, back-up communication equipment 160 may also be rendered inoperable since the AC power supply supplies the power to the equipment.

The present invention proposes a voltage inverter coupled to the power supply of the control panel which can provide AC power to the network hardware devices. The voltage inverter converts the DC voltage of the back-up power supply to household or commercial AC current. In a preferred embodiment, the voltage inverter is mounted on the printed circuit board and is coupled to the network hardware devices.

Figure 2:
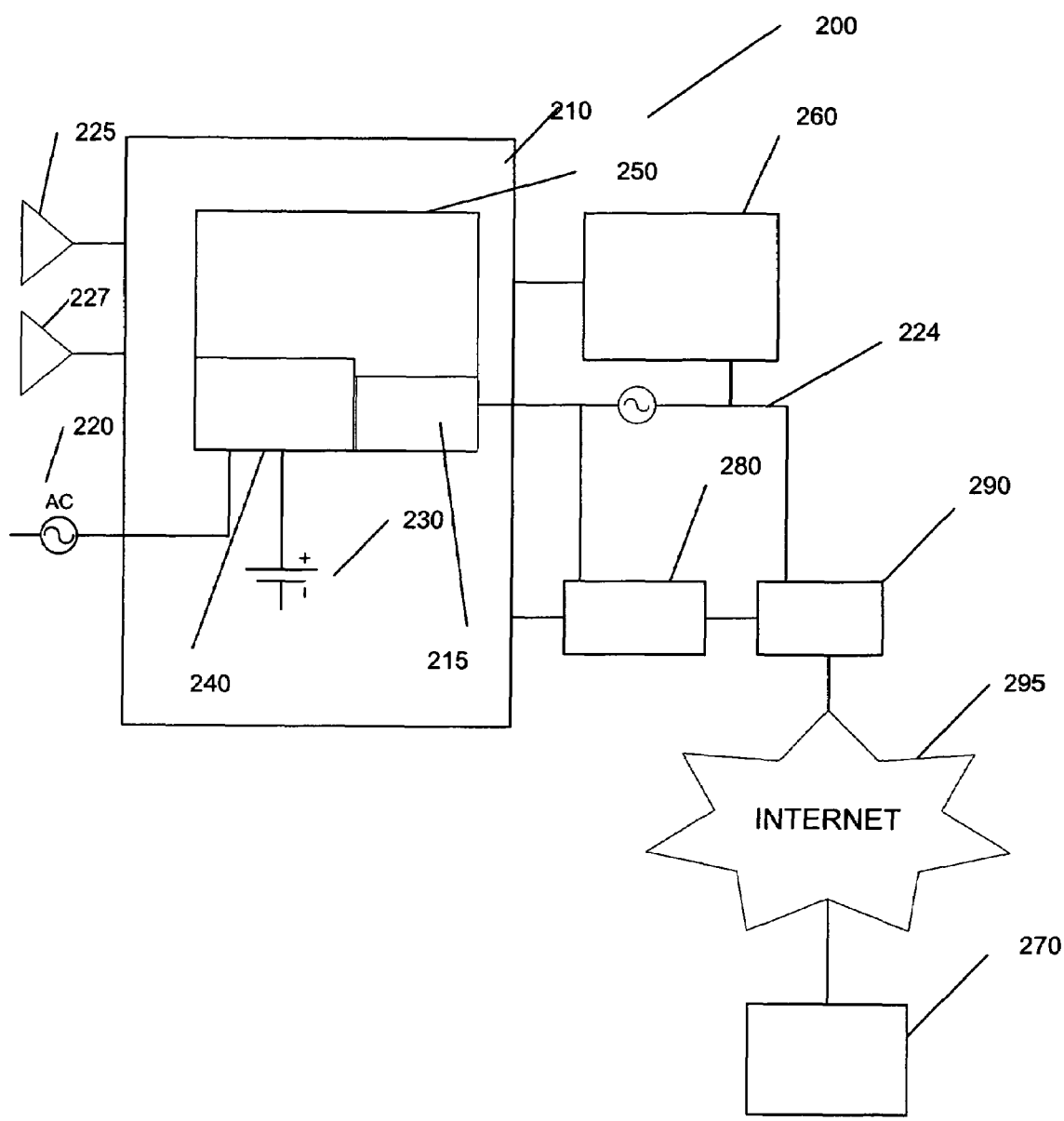
FIG. 2 is a schematic diagram of a security system in accordance with one embodiment of the invention.

Referring now to FIG. 2, there is shown a schematic diagram of the security system 200 in accordance with an embodiment of the present invention. Security system 200 includes the control panel 210 which may use proprietary busesand separate wiring and cables within a building to communicate with a variety of sensors 225 and 227. The sensors 225, 227 may be, for example, radio frequency motion sensors, cameras, alarm reporting devices, or the like, which generally report intrusions or emergencies in the building to the control panel. In a preferred embodiment, the sensors are coupled to Ethernet lines and are powered by the Ethernet line. So-called power over Ethernet sensors can ease the power wiring requirements since the sensors are powered over the Ethernet connections. The control panel 210 typically houses the electronics of the control panel on a printed circuit board 250. Although not described in detail here, the printed circuit board 250 may contain electronic components for prioritizing and maintaining sensor inputs to the security system and detection and reporting components for reporting conditions to the central monitoring station. The printed circuit board includes a power supply 240 for regulating the power delivered to components on the printed circuit board and to sensors 225 and 227.

A voltage inverter 215 is shown as residing on the printed circuit board 250. The voltage inverter converts DC power to AC power/current. Electrical power/current is provided to networking hardware devices over electrical wiring/cables 224 to the printed circuit board and to network switches and routers 280 and 290.

In a preferred embodiment, the security system may include a back-up communication equipment 260 for providing communication to the central monitoring station 270 when the primary communication is unavailable. Such back-up communication equipment 260 may be a GSM dialer configured to communicate wirelessly to the central monitoring station. In an alternative embodiment, the back-up communication equipment 260 may be a telephone modem configured for communicating with the central monitoring station 270 through plain old telephone service (POTS) lines. The back-up communication equipment 260 is powered by wiring/cable from the voltage inverter.

Generally, the control panel and sensors are powered by a power supply 240 which regulates the voltage and current to prevent overloading or spikes in the voltage. The power supply additionally monitors the AC power source 220 for interruptions, and switches to the back-up power supply 230 in those cases. The back-up power supply 230 is illustrated as a rechargeable lead acid battery providing DC power to the control panel and the sensors. It will be understood that the back-up power supply may be an uninterruptible power supply (UPS) which may be comprised of a lead-acid battery, generator, or a metal fuel cell. In any case, the back-up power supply may have the capacity to provide power to the control panel and sensors for a short period of time.

In operation, the security system 200 of FIG. 2 utilizes the voltage inverter for providing a constant power supply for the network hardware devices. Voltage inverters are well known circuits which convert a DC voltage input to an AC voltage output. In this case, the battery voltage in the panel is 12 (or 24) VDC, and required AC voltage depends on geographic location (120V/60 Hz in North America). This invention uses the battery voltage and other I/O between the control panel and voltage inverter to provide an intelligent, monitored, battery backed-up power supply for external AC powered devices.

The voltage inverter monitors the power/current from the power source 220. When the power source is interrupted, the voltage inverter converts the DC voltage from the back-up battery to AC power/current for the network hardware devices. Otherwise, during normal operation, the voltage inverter acts as a pass-through device allowing AC power to the network hardware devices. In an alternative embodiment, the voltage inverter may always supply power to the network devices to avoid possible switching glitches when AC power is lost.

The preferred embodiment of the present invention, a monitored voltage inverter for a security system, is thus described. While the present invention has been described in particular embodiments, it should be appreciated that the present invention should not be construed as limited by such embodiments, but rather construed according to the below claims.

What is claimed is:

1. A security system comprising:
   a control panel;
   sensors electrically coupled to said control panel;
   a network hardware device coupled to said control panel for transmitting and receiving data;
   a power supply for powering said control panel, said power supply coupled to an AC power source and a back-up power source; and
   a voltage inverter in series with said power supply, said voltage inverter configured for powering said network hardware device.

2. The security system of claim 1 wherein said back-up power source is a battery.

3. The security system of claim 2 wherein said battery is a lead-acid battery.

4. The security system of claim 1 wherein said back-up power source is a fuel cell.

5. The security system of claim 1 wherein said sensor is a motion sensor.

6. The security system of claim 1 wherein said sensor is a radio frequency sensor.

7. The security system of claim 1 wherein said sensor is an intrusion sensor.

8. The security system of claim 1 wherein said network hardware device is a hub.

9. The security system of claim 1 wherein said network hardware device is a switch.

10. The security system of claim 1 wherein said network hardware device is a router.

11. The security system of claim 1 wherein said network hardware device is a modem.

12. The security system of claim 1, further comprising:
    a back-up communication device coupled to said control panel, wherein said voltage inverter is configured for powering said back-up communication device.

13. The security system of claim 1 wherein said back-up communication device is a GSM dialer.

14. The security system of claim 1 wherein said back-up communication device is a telephone modem.

15. A method of providing power to a security system, said security system including a control panel; sensors electrically coupled to said control panel; a network hardware device coupled to said control panel for transmitting and receiving data; a power supply for powering said control panel, said power supply coupled to an AC power source and a back-up power source; and a voltage inverter in series with said power supply, said method comprising the steps of:
    at the voltage inverter, monitoring said AC power source;
    providing AC power to said control panel and to said network hardware device if said AC power source is operating; and
    if said AC power source is interrupted, converting DC power from said back-up power source to AC power and providing said AC power to said network hardware device.

16. The method of claim 15 wherein said back-up power source is a battery.

17. The method of claim 16 wherein said battery is a lead-acid battery.

18. The method of claim 15 wherein said back-up power source is a fuel cell.

19. The method of claim 15 wherein said network hardware device is a hub.

20. The method of claim 15 wherein said network hardware device is a switch.

21. The method of claim 15 wherein said network hardware device is a router.

* * * * *